United States Patent [19]
Stolan

[11] Patent Number: 5,864,663
[45] Date of Patent: Jan. 26, 1999

[54] SELECTIVELY ENABLED WATCHDOG TIMER CIRCUIT

[75] Inventor: John Stolan, San Jose, Calif.

[73] Assignee: United Technologies Corporation, Hartford, Conn.

[21] Appl. No.: 712,915

[22] Filed: Sep. 12, 1996

[51] Int. Cl.[6] .............................. G06F 11/00; G06F 11/30
[52] U.S. Cl. ................ 395/185.08; 395/557; 395/182.21
[58] Field of Search ......................... 395/185.08, 185.04, 395/182.21, 182.2, 557

[56] References Cited

U.S. PATENT DOCUMENTS

| | | | |
|---|---|---|---|
| 4,234,920 | 11/1980 | Ness et al. ............................ | 395/182.2 |
| 4,586,179 | 4/1986 | Sirazi et al. ............................... | 371/12 |
| 4,627,060 | 12/1986 | Huang et al. ............................... | 371/62 |
| 4,628,480 | 12/1986 | Floyd ....................................... | 395/309 |
| 4,698,748 | 10/1987 | Juzswik et al. ........................ | 395/750 |
| 4,708,831 | 11/1987 | Elsworth et al. ....................... | 261/130 |
| 4,809,280 | 2/1989 | Shonaka ............................. | 395/185.08 |
| 4,837,702 | 6/1989 | Obrea ..................................... | 395/557 |
| 4,860,289 | 8/1989 | Coulson ............................. | 395/182.13 |
| 4,879,647 | 11/1989 | Yazawa .................................. | 364/200 |
| 4,982,404 | 1/1991 | Hartman ................................... | 371/62 |
| 5,218,707 | 6/1993 | Little et al. ............................. | 395/800 |
| 5,341,497 | 8/1994 | Younger ................................ | 395/575 |
| 5,345,583 | 9/1994 | Davis .................................. | 395/182.2 |

*Primary Examiner*—Ly Hua

[57] ABSTRACT

A watchdog timer circuit includes a cyclic counter having an overflow signal that functions as a reset pulse to a microprocessor. The timer circuit includes a feature for selectively supplanting the overflow signal to enable in situ programming of the microprocessor.

10 Claims, 4 Drawing Sheets

SELECTIVELY ENABLED WATCHDOG TIMER CIRCUIT

TECHNICAL FIELD

The present invention relates to microprocessor control circuits, and more specifically to watchdog timer circuits for supervising microprocessor operation.

BACKGROUND OF THE INVENTION

The use of watchdog circuits to monitor the operation of microprocessors and to reset them in the event of aberrant operation is well known. Such circuits provide the reset command necessary to ensure that a microprocessor returns to a known reference point after a failure in order to resume a designated manner of operation.

Failure of a microprocessor to perform correctly during normal operation is typically a result of, though not limited to, any of three situations. The first is external electromagnetic interference (EMI), which can cause the power being supplied to a microprocessor to fluctuate, whereby the microprocessor produces unpredictable results. Secondly, external radiation, such as that found in outer space, can cause single event upsets (SEU) that also result in erratic operations. Finally, errors may also follow from unanticipated software bugs. These types of situations may cause erratic operation to occur at random intervals or continuously for extended periods of time. Thus, there is a need to reset microprocessors not only when a discrete interruption occurs but also to reset them continuously in the event of a prolonged interruption.

Furthermore, such resets often must occur quickly after a microprocessor enters an errant state of operation to prevent potentially hazardous or even fatal consequences, such as with use in an alarm system. Additionally, when power is supplied to microprocessors they are in undefined states of operation. Thus, an initialization or power-on reset is also necessary to ensure that a microprocessor will begin its designated mode of operation at the outset.

Accordingly, it is desirable to have a watchdog timer with the following features: a continuous reset for repeatedly resetting the microprocessor as necessary to return it to a normal state of operation; a quick response window to ensure that the microprocessor is reset quickly; and a power-on reset (POR) to reset the microprocessor following the initial application of electrical power.

The prior art does not teach how to combine these features within a single watchdog timer circuit. For instance, Younger (U.S. Pat. No. 5,341,497) discloses a circuit for detecting an anomalous operating state of a microprocessor that continually resets the microprocessor until a specified number of resets occurs, at which point an alarm is tripped. Younger further provides a limited response window feature for generating a reset upon occurrence of an errant state. However, Younger does not teach a method for implementing a POR feature. In like manner, Huang et al. (U.S. Pat. No. 4,627,060) discloses a watchdog timer with a limited response window feature and a POR feature, but no continuous reset feature.

In addition to the failure of the prior art watchdog timers to combine all of the above features in a single device, the current state of the art also does not allow the disabling of any of these features once they are in place. Current watchdog circuits constantly maintain control over their microprocessor reset inputs whenever power is supplied to the system. Yet, there are discretionary microprocessor functions which also must have access to the microprocessor reset input if they are to be performed, such as the ability to re-program microprocessors to perform alternate tasks.

As a result of this limitation, re-programming is typically conducted by physically removing the microprocessor from its circuit board and associated watchdog circuitry and placing it in a commercially available programming device. The programming device can then access the microprocessor reset without interference from the watchdog circuitry.

However, off-board programming can be problematic as well as time and labor intensive for numerous reasons. Microprocessors are typically the largest of all integrated circuits (IC) and accordingly have the most input and output (I/O) pins of all ICs. The delicate nature of the I/O pins requires meticulous handling to avoid damage thereof. Also, microprocessors are fastened to a circuit board by placing the I/O pins through tiny holes in the board and soldering the pins in place. Here again, the delicate I/O pins can be damaged from this fastening and unfastening.

The microprocessor, circuit board, and other circuit components can also be damaged during fastening and unfastening by the heat source required for soldering. Accordingly, the solder must be applied and removed from these pins with a narrowly focused heat source. Since microprocessors may have several hundred I/O pins, it becomes cumbersome to carefully remove the soldering from each of these pins. Additionally, ICs are susceptible to electrostatic discharge and can be damaged as a result thereof. Thus, it is desirable to handle these chips as little as possible so as to reduce the chances of such thermal and electrostatic damage.

Accordingly, there is a need for a watchdog timer that can be disengaged from microprocessor reset inputs, thereby allowing remote access to a microprocessor for in situ programming thereof.

DISCLOSURE OF INVENTION

It is therefore an object of the present invention to provide an improved watchdog timer circuit that incorporates the features of a continuous reset, a quick response window, and a power-on reset. It is a further object of the present invention to provide such an improved watchdog timer with the additional feature of being selectively disabled, thereby permitting a user external access to the reset input of a microprocessor for in situ programming of same.

According to the present invention, an improved watchdog timer circuit is provided that includes a cyclic counter with an overflow bit for counting pulses provided by a timer. The counter alternately increments and decrements an output counter response to a periodic command signal from the microprocessor. The failure of the microprocessor to provide this command signal causes the counter to set the overflow bit, which resets the microprocessor. The overflow bit is continuously set as the counter cycles through its maximum count as long as the microprocessor fails to provide the command signal, thereby providing a continuous reset to the microprocessor. The overflow bit of the counter will also be set upon application of power to the microprocessor, thereby providing a power-on reset to the microprocessor.

The size of said counter and frequency of said timer are chosen such that the duration between reset pulses is both long enough to afford the microprocessor adequate time to prohibit the reset and yet still short enough to cause the microprocessor to reset quickly after entering an aberrant state, thereby providing a quick response window.

In further accord with the present invention, the apparatus includes a multiplexer for selectively electrically connecting either the overflow bit of said counter (the "normal reset") or an external programming reset signal to the microprocessor, thereby enabling in situ programming thereof.

These and other objects, features, and advantages of the present invention will become more apparent in light of the following detailed description of a best mode embodiment thereof, as illustrated in the accompanying Drawings.

BEST MODE FOR CARRYING OUT THE INVENTION

Figure 1:
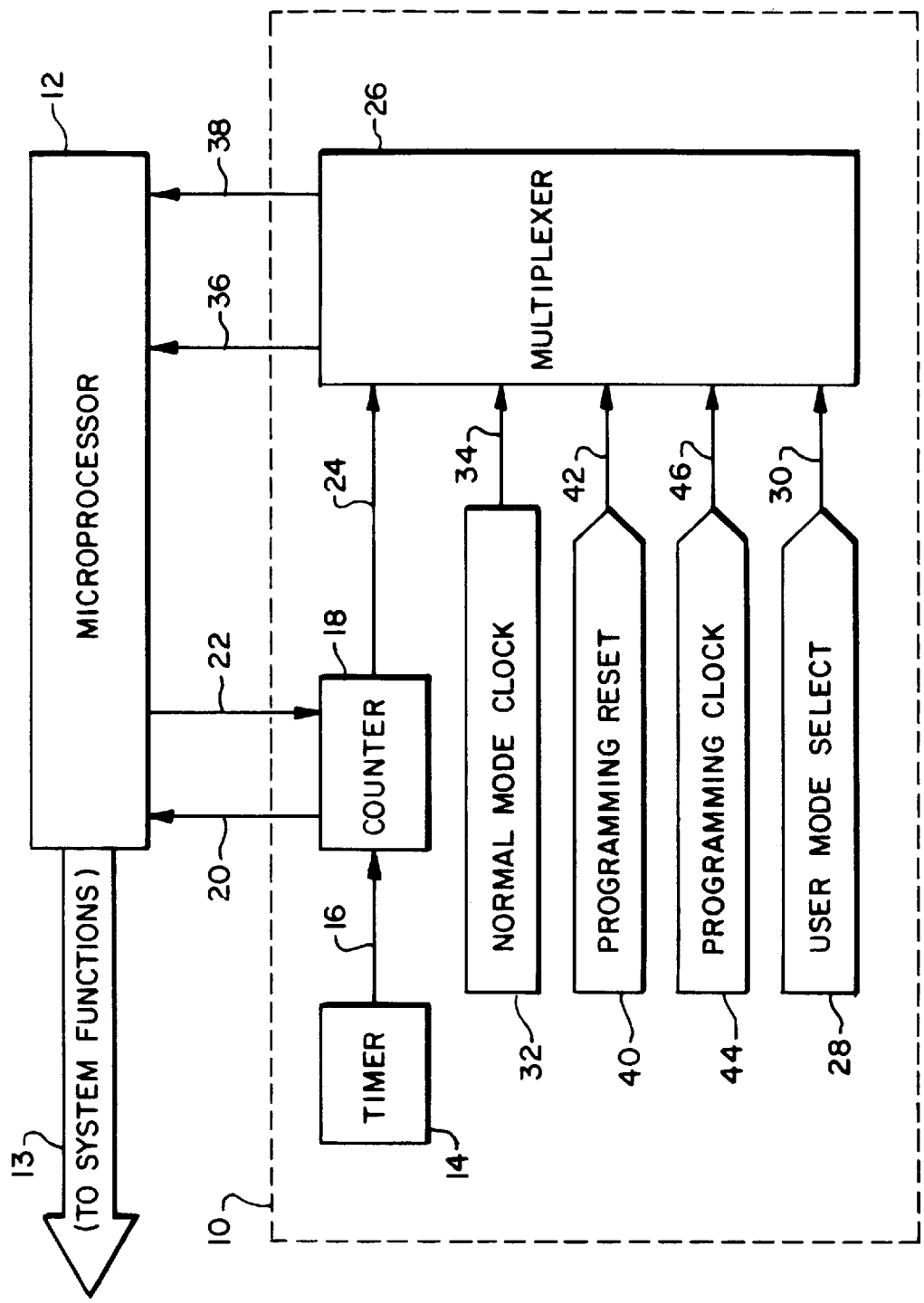
FIG. 1 is a simplified system block diagram of a best mode embodiment of a watchdog timer according to the present invention.

FIG. 1 is a simplified system block diagram of the watchdog timer circuit 10 of the present invention for supervising a microprocessor 12. In the present embodiment, the microprocessor 12 is an Intel 87C51-16. However, the present invention could be utilized with other microprocessors, as would be evident to those of ordinary skill in the art. The input and output lines of the microprocessor 12 are generically denoted by an arrow 13 leading to system functions, as they are not utilized by watchdog timer circuit 10 and accordingly do not require further description here.

A timer 14 provides a serial timing pulse signal on a line 16 to a counter 18. The counter 18 continually increments or decrements the current count stored in its register at the frequency of the timing pulses supplied by the timer 14. Unless otherwise prevented by the microprocessor 12 from reaching the upper or lower counting limit, the counter 18 pulses its overflow bit, resets its internal register, and begins counting again toward the counting limit.

In normal operation, the microprocessor 12 prevents the counter 18 from overflowing by monitoring, through a line 20, the status of the most significant bit (MSB) of the word stored in the register of the counter 18. As described in detail hereinafter, based upon the MSB status, the microprocessor 12 periodically instructs the counter 18 to change its counting direction through a line 22. In this manner, the microprocessor 12 prevents the counter 18 from reaching its upper or lower counting limit, thereby averting an overflow signal through a line 24 to a multiplexer 26.

The reason for monitoring the MSB, as opposed to a lesser significant bit, is that when the MSB goes from a low state to a high state the current count is half-way between the upper and lower counting limits of the counter. Thus, the microprocessor 12 has an equal amount of counts to avoid an overflow regardless of which counting limit will be surpassed next.

In the present invention, a user mode select signal 28 is provided by an operator to the multiplexer 26 though a line 30. The select signal 28 has two states: a normal mode which causes the watchdog timer circuit 10 to operate in the normal mode; and a programming mode, described hereinafter. The multiplexer 26 connects the counter's overflow bit on the line 24 and a normal mode clock 32 on a line 34 to the microprocessor 12 through lines 36 and 38, respectively. When the user mode select signal 28 is set for the programming mode, the multiplexer 26 disconnects the counter's overflow bit and the normal clock signal from the microprocessor and replaces them with a programming reset signal 40 on a line 42 and a programming clock signal 44 on a line 46. Again, the programming reset signal 40 and programming clock signal 44 pass through the multiplexer 26 and enter the microprocessor 12 on lines 36 and 38, respectively.

Figure 2:
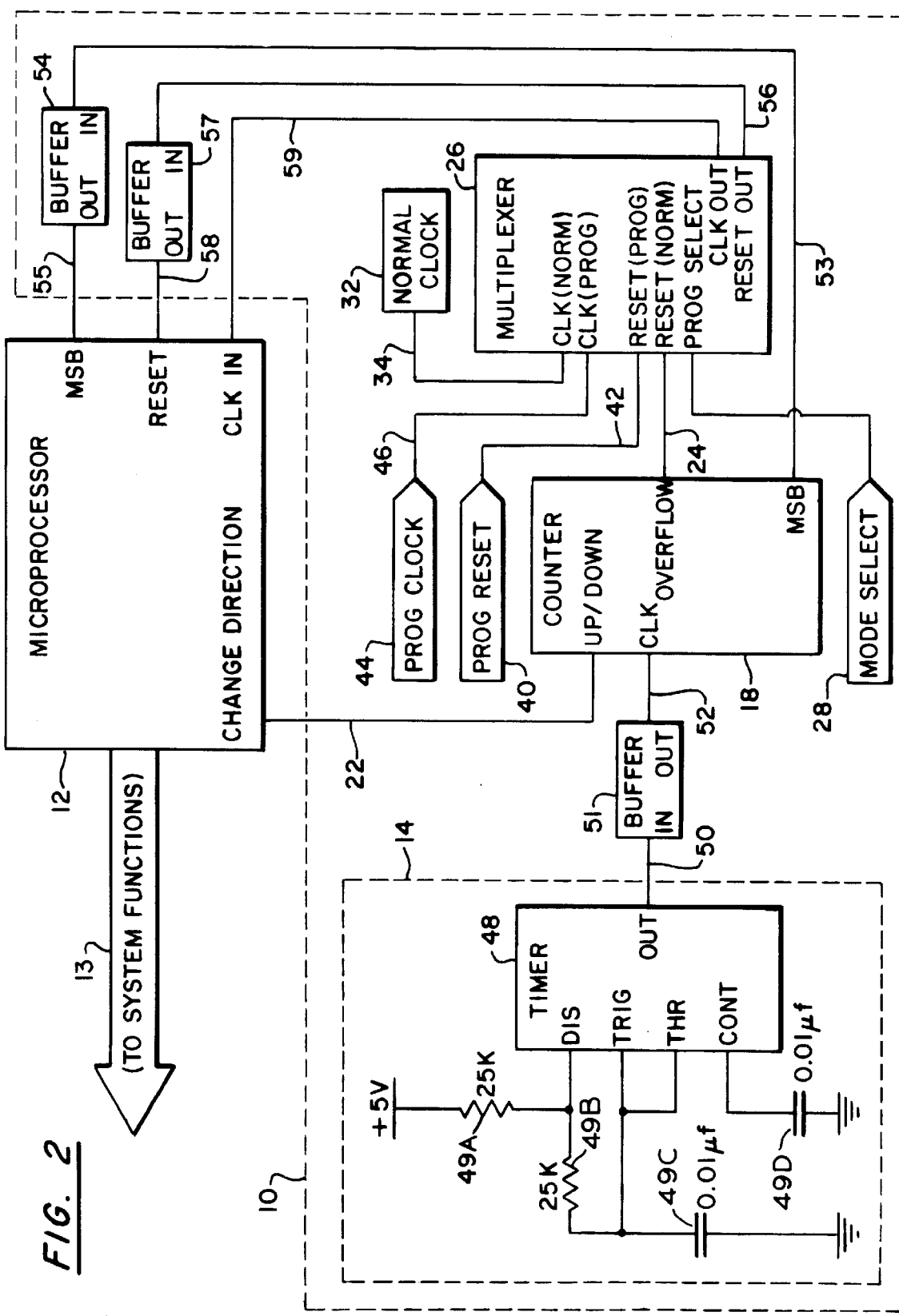
FIG. 2 is a detailed schematic of the watchdog timer of FIG. 1.

FIG. 2 is a detailed schematic illustration of the watchdog timer 10 of FIG. 1. The timer 14 is a known type counter, such as a Signetics 555 timer 48 (model 555/BCA(MIL)), with external resistors and capacitors 49A–49D which are configured to provide a time constant such that a continuous timing pulse of 250 microsecond period (frequency of 4 KHz) is provided through a line 50, a buffer 51, and a line 52 to the counter 18. The buffer 51 is a known device, such as a Schmitt trigger, National Semiconductor model 54AC14, used to ensure proper input drive level to the counter 18. Equivalents for generating a timing pulse train, as known to those of ordinary skill in the art, would also suffice.

The timing pulses enter the counter 18, which in a best mode embodiment comprises a 4-bit National Semiconductor 54AC169, and subsequently increment or decrement the count stored in its internal register. As a 4 bit counter, the counter 18 thus allows the microprocessor 12 a maximum of 16 counts before an overflow condition occurs, or a maximum allowable response window of 4 milliseconds (obtained from multiplying 16 counts and the 250 microsecond timing pulse). This would be the case during a POR, where the counter would count through its entire cycle before overflowing and resetting microprocessor 12.

However, during normal operation, the counter will normally dither around the decimal number "8"(or binary "1000"), where the MSB changes state, thus the counter 18 will only allow the microprocessor 12 approximately 8 counts before an overflow condition occurs, or a response window of 2 milliseconds (obtained from multiplying 8 counts and the 250 microsecond timing pulse).

The microprocessor 12 chooses the current count direction based upon the status of the MSB of the word stored in the counter 18. If the MSB is in a logic high position, the microprocessor 12 will send a count down signal (logic zero), on the line 22, to the counter 18 until the MSB is logic zero. If the MSB is not in a logic high position, the microprocessor 12 will send a count up signal (logic high) to the counter until the MSB is set. The MSB signal enters microprocessor 12 through a line 53, a buffer 54 (again, a Schmitt trigger 54AC14 to ensure proper input drive level to the microprocessor 12), and a line 55.

In the present embodiment, the count up and count down signals are implemented by setting the count direction to be the inverse of the MSB.

Also, the microprocessor is programmed to check the MSB status every millisecond, or once every 16,000 clock pulses of the 16 MHz normal system clock 32. Thus, the microprocessor 12 is programmed in the present embodiment to check the MSB at half of the interval it will take the counter 18 to overflow during normal operation. Equivalent variations for generating the count change direction signal, as well as different variations of the timing intervals mentioned herein, could also be used.

When the watchdog timer circuit 10 is operating in normal mode, the multiplexer 26 (shown as a National Semiconductor 54AC157, or equivalent) passes the overflow signal directly to the reset input of the microprocessor 12 through a line 56, a buffer 57 (here again, a Schmitt trigger 54AC14 to ensure proper input drive level to the microprocessor 12), and a line 58. The normal mode occurs when the mode select signal 28 is set to a logic zero. The normal mode clock signal 32, provided by a 16 MHz CTS model CTX116 oscillator, or equivalent, is also passed directly through the multiplexer 26 to the clock input of the microprocessor 12 on a line 59 during normal mode.

However, when the program mode select signal 28 is set to logic high, meaning that the watchdog timer circuit 10 is in the programming mode, a programming reset signal 40 is passed on a line 42 to the multiplexer 26, where it then passes on the 56, the buffer 57, and the line 58 to the reset input of the microprocessor 12. Likewise, a program clock signal 44, a 5 MHz clock signal as required by the manufacturer for programming a 87C51-16, passes through the multiplexer 26 in place of the normal clock 32 to the clock input of the microprocessor 12 on the line 59.

The logic components noted above are CMOS logic devices of the 54AC family because they are compatible with the microprocessor used in the present embodiment. Though clock 32 is a TTL device in the present embodiment, it will sufficiently drive the 54AC logic without external pull-up resistors or further modification. Equivalent logic families and devices could be interchanged for those mentioned herein, as used in accordance with the requirements of a given host microprocessor and as would be evident to one of ordinary skill in the art.

Figure 3:
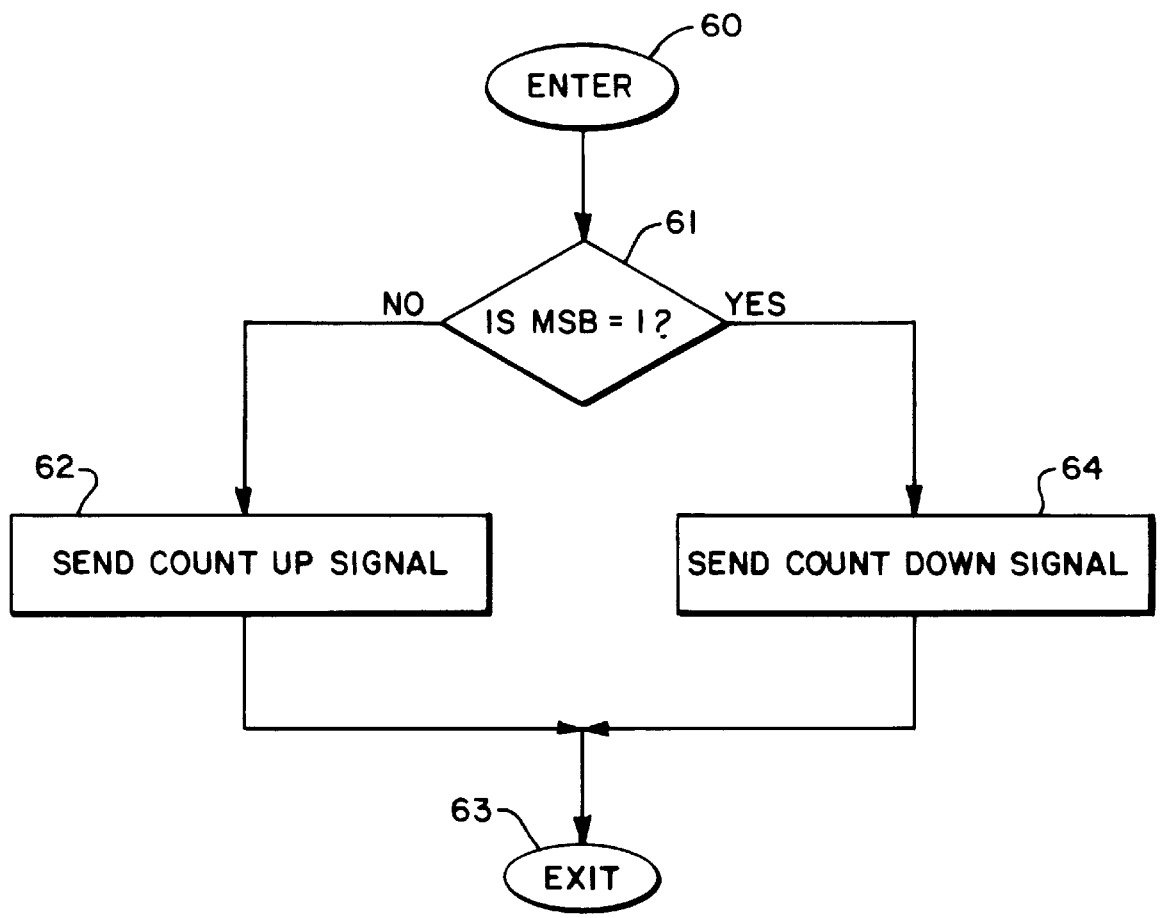
FIG. 3 is a flow diagram depicting the operational steps associated with the operation of the watchdog timer of FIG. 1.

FIG. 3 is a flow diagram depicting the counter checking program of the microprocessor 12 of FIG. 1. The microprocessor 12 first enters the counter checking program, denoted by entry an block 60. The next order of operation is to determine if the MSB of the counter 18 has reached logic high, which is shown by decision a block 61. If the MSB is found not to be logic high, the microprocessor 12 sends a count up (logic zero) signal to the counter 18, as seen in an operation block 62, and exits the counter checking program, as shown by an exit block 63. If the MSB is found to be logic high, the microprocessor 12 sends a count down signal to the counter 18, as depicted in an operation block 64, and exits the counter checking program, again shown by the exit block 63. This process would repeat at one millisecond intervals thereafter.

Figure 4:
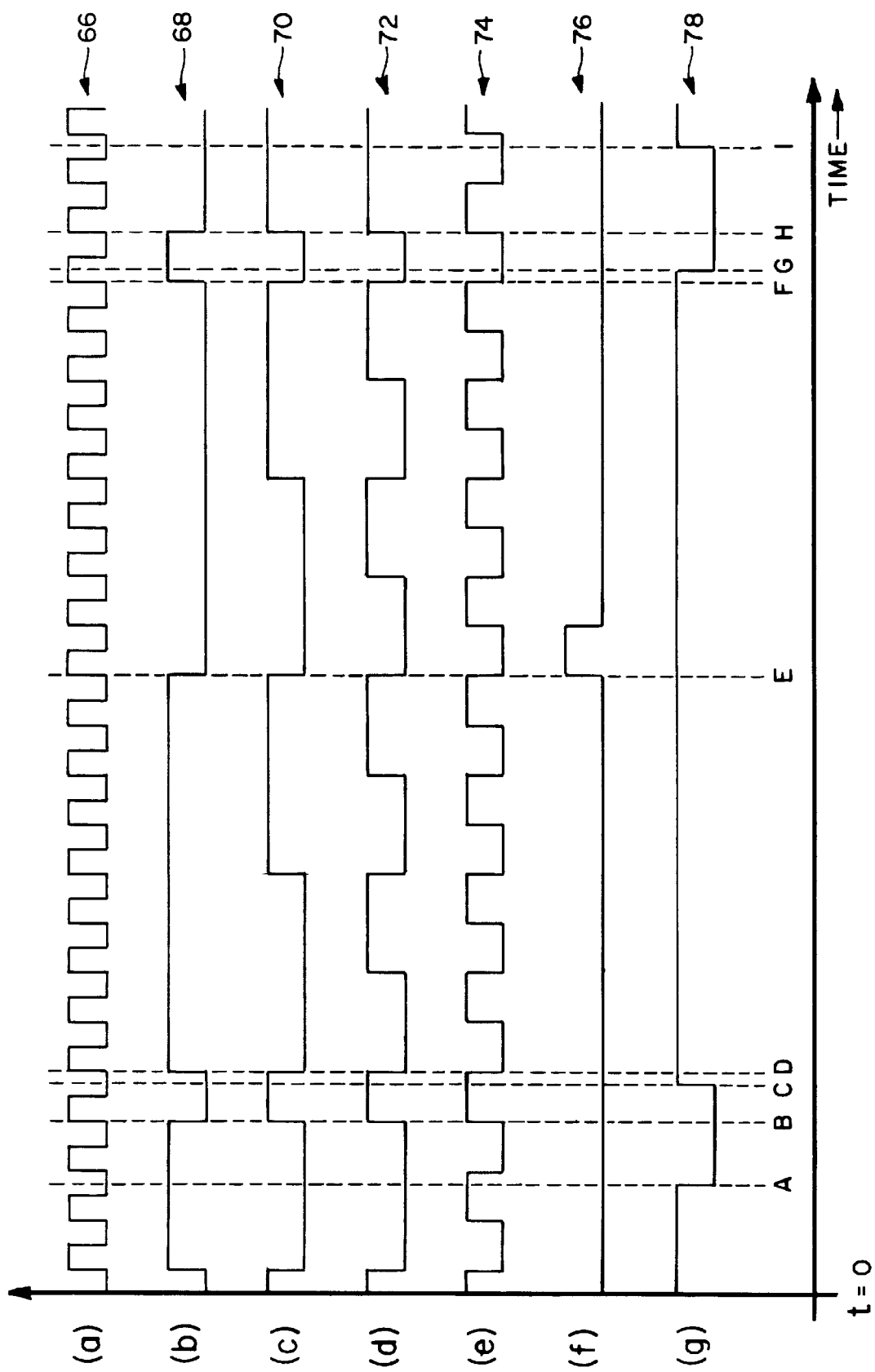
FIG. 4 is timing diagram depicting the operational flow of the embodiment of FIG. 1.

FIG. 4 is a timing diagram which further illustrates the operational flow of the watchdog timer circuit 10 of FIG. 1. FIG. 4 illustration (a) shows a timing pulse signal 66, the 250 millisecond timing pulse generated by the timer 14. FIG. 4 illustration (b) shows a MSB 68, the most significant bit of the word stored in the counter 18, which corresponds to the decimal value "8" when set high. FIG. 4 illustration (c) shows a second MSB 70, the second most significant bit of the word stored in the counter 18, which corresponds to the decimal value "4" when set high. FIG. 4 illustration (d) shows a third MSB 72, the third most significant bit of the word stored in the counter 18, which corresponds to the decimal value "2" when set high. FIG. 4 illustration (e) shows a least significant bit (LSB) 74, the least significant bit of the word stored in the counter 18, which corresponds to the decimal value "1" when set high. Furthermore, FIG. 4 illustration (f) shows the overflow reset signal 76 of the counter 18, where a logic high pulse represents a reset instruction. Finally, FIG. 4 illustration (g) shows the count direction 78 of the counter 18, where a logic high signal indicates a count up command and a logic low signal indicates a count down command.

Along with the various illustrations of FIG. 4 are temporal reference points generally indicated by letters A–I. At t=0, the current count of the counter 18 is decimal "7" and is incrementing, as shown by the count direction 78. At point A microprocessor 12 has detected that the MSB 68 is set and changes the count direction 78 to count down. By point B the count has decremented to decimal "7" whereby MSB 68 is no longer high.

At point C the microprocessor 12 detects that the MSB 68 is no longer high, causing the count direction 78 to change to the count up position. Point D is when the effect of the count change at point C takes effect, causing the MSB 68 to go high. Shortly after point D, a fault condition occurs which fixes the count direction 78 in the increment position and renders the microprocessor 12 unable to change the count direction 78. The counter 18 continues to increment the current count until point E, when the count surpasses the maximum allowable counting limit (decimal "15") and the overflow reset signal 76 pulses high, causing microprocessor 12 to reset.

The counter 18 continues to increment thereafter from zero up until point F, where the count becomes decimal "8" and the MSB 68 is once again set high. At point G, microprocessor 12 has determined that the MSB 68 is high and accordingly sets the count direction 78 low, causing the counter 18 to count down. At point H, the MSB 68 falls low, and at point I the microprocessor 12 determines that the MSB 68 is no longer high and changes the count direction 78. The above described process would then continue repeatedly until another error condition occurred.

Although the invention has been shown and described with respect to a best mode embodiment thereof, it should be understood by those skilled in the art that various changes, omissions, and additions may be made to the form and detail of the disclosed embodiment without departing from the spirit and scope of the invention as recited in the following claims.

I claim:

1. An improved watchdog timer circuit for monitoring a microprocessor and resetting the microprocesser upon detection of aberrant operation that allows in situ programming of the microprocessor, the circuit comprising:

a timer for generating timing pulses of specified frequency;

a cyclic counter with an overflow bit which functions as a reset pulse to the microprocessor, the counter being of the type for incrementing or decrementing a stored count in accordance with the pulses of said timer; and a switching means for selectively supplanting the overflow signal of said counter with an external programming reset signal to enable in situ programming of the microprocessor.

2. The watchdog timer of claim 1, wherein said timer provides continuous timing pulses upon application of electrical power thereto, and said counter continually counts in response to the timing pulses.

3. The watchdog timer circuit of claim 2 wherein the microprocessor generates, during non aberrant operation, a signal that causes a reversal of the count direction of said counter and thereby prevents said counter from overflowing, whereby said counter repeatedly overflows when the microprocessor is in an aberrant operating mode, thereby causing a power-on reset when the microprocessor initializes in an errant state following application of power thereto and a continuous reset when the microprocessor remains in an aberrant operational state for extended temporal periods.

4. The watchdog timer circuit of claim 3 wherein the microprocessor generates said signal in response to said count of said counter.

5. The watchdog timer of claim 1, wherein the frequency of said timer and count capacity of said counter are selected such that when used in conjunction the interval preceding generation of the overflow by said counter is longer than the interval at which the microprocessor validates its operational state, yet short enough to provide a quick response window from the instant when the microprocessor enters a state of aberrant operation until the instant when the overflow signal is generated.

6. The watchdog timer of claim 1, wherein said counter further comprises an upper and a lower counting limit and generates the overflow signal upon surpassing either counting limit.

7. The watchdog timer of claim 6, wherein the microprocessor generates, in response to said count of said counter, a signal that causes a reversal of the count direction of said counter, thereby preventing said counter from surpassing either counting limit and generating said overflow signal.

8. The watchdog timer of claim 7, wherein the microprocessor generates said signal in response to a most significant bit of said count of said counter.

9. The watchdog timer circuit of claim 1 wherein the microprocessor generates, during non aberrant operation, a signal that causes a reversal of the count direction of said counter and thereby prevents said counter from overflowing.

10. The watchdog timer circuit of claim 9 wherein the microprocessor generates said signal in response to said count of said counter.

* * * * *